US012092293B2

(12) United States Patent
Wang

(10) Patent No.: US 12,092,293 B2
(45) Date of Patent: Sep. 17, 2024

(54) OUTDOOR DECORATIVE LAMP

(71) Applicant: DONGGUAN HUIHUAN LIGHTING CO., LTD, Dongguan (CN)

(72) Inventor: Song Wang, Chengdu (CN)

(73) Assignee: DONGGUAN HUIHUAN LIGHTING CO., LTD., Dongguan (CN)

( * ) Notice: Subject to any disclaimer, the term of this patent is extended or adjusted under 35 U.S.C. 154(b) by 0 days.

(21) Appl. No.: 18/404,803

(22) Filed: Jan. 4, 2024

(65) Prior Publication Data

US 2024/0142080 A1 May 2, 2024

(30) Foreign Application Priority Data

Dec. 20, 2023 (CN) ........................ 202323471374.5

(51) Int. Cl.

| | |
|---|---|
| ***F21V 1/12*** | (2006.01) |
| ***F21Y 103/10*** | (2016.01) |
| ***F21Y 113/00*** | (2016.01) |
| ***F21Y 115/10*** | (2016.01) |

(52) U.S. Cl.

CPC ............ *F21V 1/12* (2013.01); *F21Y 2103/10* (2016.08); *F21Y 2113/00* (2013.01); *F21Y 2115/10* (2016.08)

(58) Field of Classification Search

CPC ...... F21V 1/12; F21V 31/005; F21Y 2103/10; F21Y 2113/00; F21Y 2115/10; F21W 2121/00; F21K 9/232; F21S 4/10

See application file for complete search history.

(56) References Cited

U.S. PATENT DOCUMENTS

| | | | | |
|---|---|---|---|---|
| 2,128,767 A * | 8/1938 | Currie | F21V 21/00 | 362/171 |
| 5,782,554 A * | 7/1998 | Huang | F21V 19/006 | 362/363 |
| 6,382,812 B1 * | 5/2002 | Hsu | F21S 4/10 | 439/699.1 |
| 7,762,710 B2 * | 7/2010 | Chang | F21S 4/10 | 362/363 |
| 10,047,913 B1 * | 8/2018 | Hsu | H01K 1/34 | |
| 10,578,254 B2 * | 3/2020 | Wang | F21V 17/14 | |
| 10,883,709 B1 * | 1/2021 | Huang | H01R 13/516 | |

(Continued)

FOREIGN PATENT DOCUMENTS

| | | |
|---|---|---|
| CN | 210424840 U * | 4/2020 |
| CN | 215807958 U * | 2/2022 |
| CN | 218209472 U * | 1/2023 |

*Primary Examiner* — Zheng Song
*Assistant Examiner* — Glenn D Zimmerman
(74) *Attorney, Agent, or Firm* — Zhigang Ma

(57) ABSTRACT

The present disclosure relates to the technical field of lamps, and discloses an outdoor decorative lamp, including a lamp holder and a lampshade connected to the lamp holder, and further including a lampwick component and a decorative shell, an annular connecting port is arranged at a top of the accommodating cavity; and the lamp holder extends out of the accommodating cavity through the annular connecting port. In the present invention, a traditional integrated barn lantern lamp is transformed into a replaceable barn lantern lamp bulb by assembling and combining a lamp bulb with the decorative shell. Lamps on a barn lantern string can be replaced at any time, which significantly reduces the usage cost.

9 Claims, 6 Drawing Sheets

(56) References Cited

U.S. PATENT DOCUMENTS

| | | | | |
|---|---|---|---|---|
| 10,948,174 | B1 * | 3/2021 | Zhang | F21V 23/001 |
| 11,644,160 | B1 * | 5/2023 | Xu | F21V 31/005<br>362/217.14 |
| 2013/0027940 | A1 * | 1/2013 | Zhang | F21S 4/10<br>362/249.06 |
| 2013/0163236 | A1 | 6/2013 | Steele | |
| 2015/0163876 | A1 * | 6/2015 | Zhang | H05B 45/00<br>362/235 |
| 2017/0227200 | A1 | 8/2017 | Zhang et al. | |
| 2018/0119936 | A1 | 5/2018 | Zhang et al. | |
| 2018/0128447 | A1 * | 5/2018 | Chen | F21V 17/16 |
| 2019/0353309 | A1 * | 11/2019 | Yu | F21K 9/238 |
| 2020/0032986 | A1 * | 1/2020 | Zhang | F21V 23/001 |

* cited by examiner

OUTDOOR DECORATIVE LAMP

TECHNICAL FIELD

The present disclosure relates to the technical field of lamps, and in particular, to an outdoor decorative lamp.

BACKGROUND

A traditional barn lantern is a kerosene lamp that can be carried in a hand and protected from wind and rainwater. This lamp can be hung on a horse during night riding, hence obtaining its name. With the development of technology, although the kerosene lamps have gradually been replaced by energy-saving and environmentally-friendly light-emitting diode (LED) lamps, the shape of the barn lantern is still widely circulated, and LED decorative light strings made in the shape of barn lantern are used for courtyard decoration.

The existing decorative barn lantern string is composed of a power cable and several lamps connected in series on the power cable. Connection between the lamps and the power cable is achieved as follows: A two-level core wire inside the power cable extends outwards to be connected to LED luminous sources, and then decorative barn lantern shells are directly integrally molded outside to form barn lantern lamps connected to the power cable. However, the lamps cannot be replaced. If one lamp is damaged, the entire string is scrapped, resulting in high usage costs. In view of this, the inventor has made a new invention.

SUMMARY

The present disclosure aims to provide an outdoor decorative lamp for the shortcomings in the prior art. The outdoor decorative lamp has the characteristics of low usage cost.

In order to achieve the above objectives, the present disclosure provides an outdoor decorative lamp, including a lamp holder, a lampshade, a lampwick component and a decorative shell. The lampshade is connected to the lamp holder. The lampwick component is connected to the lamp holder and extends into the lampshade. The lampwick component includes a first conductive core wire, an LED luminescent lamp body, and a second conductive core wire which are connected in sequence. The decorative shell includes a first shell body and a second shell body, where the first shell body and the second shell body are detachably connected to each other to form an accommodating cavity for receiving the lampshade. Each of the first shell body and the second shell body includes an arc-shaped first hoop at a top of the shell body, an arc-shaped second hoop at a middle of the shell body, and a half shell at a lower end of the shell body. When the first shell body and the second shell body are connected to each other, the first hoops on the first shell body and the second shell body cooperate to form an annular limiting hoop at a top of the accommodating cavity. The annular limiting hoop is configured to limit the lampshade within the accommodating cavity, and the lamp holder extends outside of the accommodating cavity through the annular limiting hoop. The second hoops on the first shell body and the second shell body cooperate to form an annular limiting frame at the middle of the accommodating cavity, where the annular limiting frame is configured to sleeve on and abut against an outer sidewall of the lampshade. The half shells on the first shell body and the second shell body cooperate to form a lamp base at a lower end of the decorative shell, where the lamp base is provided with an accommodating opening adapting to a bottom end of the lampshade. The accommodating opening is configured to receive and fix the bottom end of the lampshade.

Further, a side wall of the accommodating cavity is hollowed out.

Preferably, the first shell body is provided with two first side walls facing the second shell body and a plurality of connecting columns arranged on the two first side walls. The second shell body is provided with two second side walls facing the first shell body and a plurality of connecting holes arranged on the two second side walls. The connecting holes correspond one-to-one with the connecting columns, and the first shell body and the second shell body are assembled together by connecting the connecting columns to the connecting holes.

Further, the first shell body and the second shell body are ultrasonically welded or bonded.

Much further, the decorative shell is in a shape of a barn lantern.

Preferably, the lampshade is provided with an assembling ring arranged at an upper end of the lampshade and connected to the lamp holder. The assembling ring is received in the accommodating cavity and abuts against the annular connecting limiting hoop.

Further, the LED luminescent lamp body includes a printed circuit board (PCB) and an integrated circuit (IC) drive controller arranged on the PCB; the PCB has at least one elongated light source integration part extending into the lampshade; the light source integration part is provided with two light-emitting chip groups on at least one side surface; the PCB is printed with a conductive pattern; the IC drive controller is electrically connected to the light-emitting chip groups through the conductive pattern and turns on cyclically the light-emitting chip groups in sequence; and the first conductive core wire and the second conductive core wire are both electrically connected to the IC drive controller.

Further, the PCB is further provided with a supporting part; the IC drive controller is arranged at the supporting part; and the PCB is further provided with an outer packaging layer configured to package the light-emitting chip groups and the IC drive controller.

Preferably, the lampwick component further includes a sealant seat; the sealant seat is in close fit with an opening part of the lampshade; and the sealant seat is provided with at least two accommodating holes for allowing the conductive core wires to pass through.

Beneficial effects: Compared with the prior art, the outdoor decorative lamp of the present disclosure, which includes the lamp holder and the lampshade connected to the lamp holder, and further includes the lampwick component and the decorative shell, has the following advantages: 1. The outdoor decorative lamp can be replaced for use, which can significantly reduce the usage cost of the lamp and prolong the service life of a light string. 2. The outdoor decorative lamp has a beautiful appearance and small volume, can achieve a flowing type light effect, and has high decorativeness. 3. The outdoor decorative lamp has a simple and novel overall structure and low preparation cost.

Figure 1:
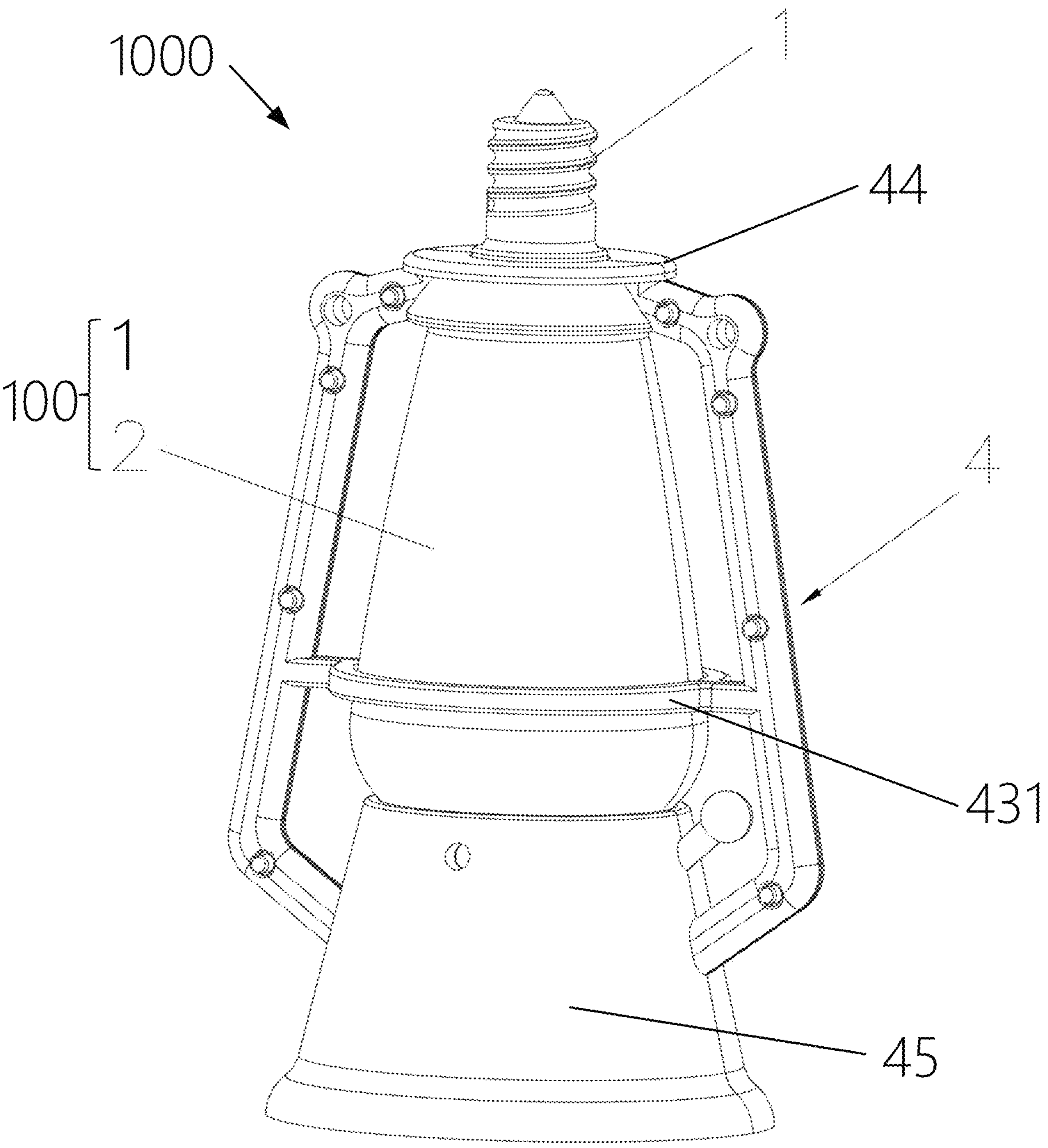
FIG. 1 is a schematic diagram of a three-dimensional structure according to the present disclosure.

Reference numerals include:

1000: outdoor decorative lamp; 100: lamp bulb; 1: lamp holder; 2: lampshade; 201: bottom end; 202: upper end; 21: assembling part; 3: lampwick component; 31: first conductive core wire; 32: LED luminescent lamp body; 321: PCB; 322: IC drive controller; 323: light source integration part; 324: light-emitting chip group; 325: conductive pattern; 326: supporting part; 327: outer packaging layer; 33: second conductive core wire; 36: sealant seat; 361: accommodating hole; 4: decorative shell; 401: first hoop; 402: second hoop; 403: half shell; 41: first shell body; 411: connecting column; 412: first side wall; 42: second shell body; 421: connecting hole; 422: second side wall; 43: accommodating cavity; 431: annular limiting frame; 44: annular limiting hoop; 45: lamp base; and 451: accommodating opening.

DETAILED DESCRIPTION OF THE EMBODIMENTS

The present disclosure will be explained below in conjunction with the accompanying drawings 1 to 6.

Figure 4:
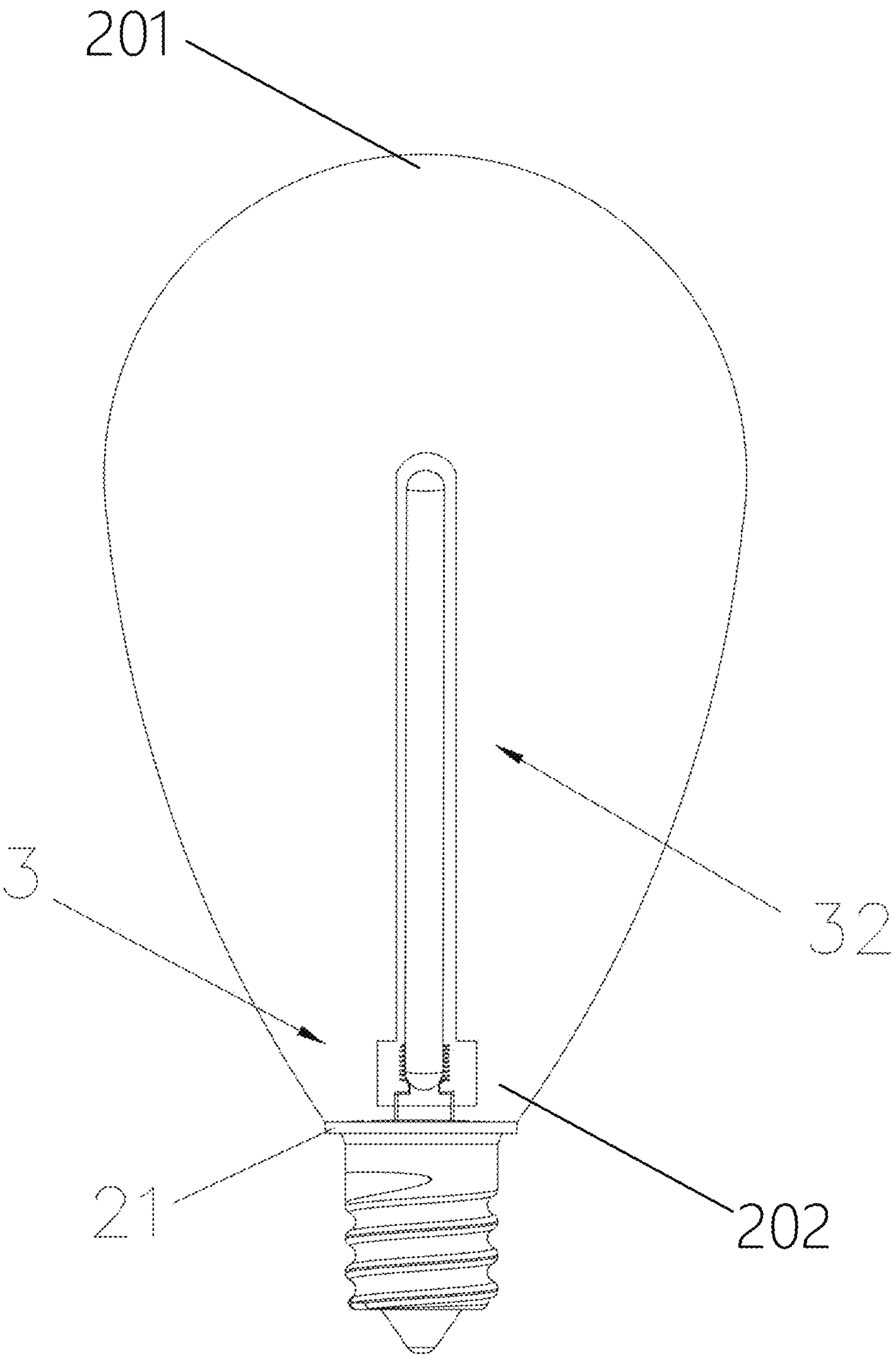
FIG. 4 is a schematic structural diagram of a combination of a lamp holder and a lampshade according to the present disclosure.
Figure 5:
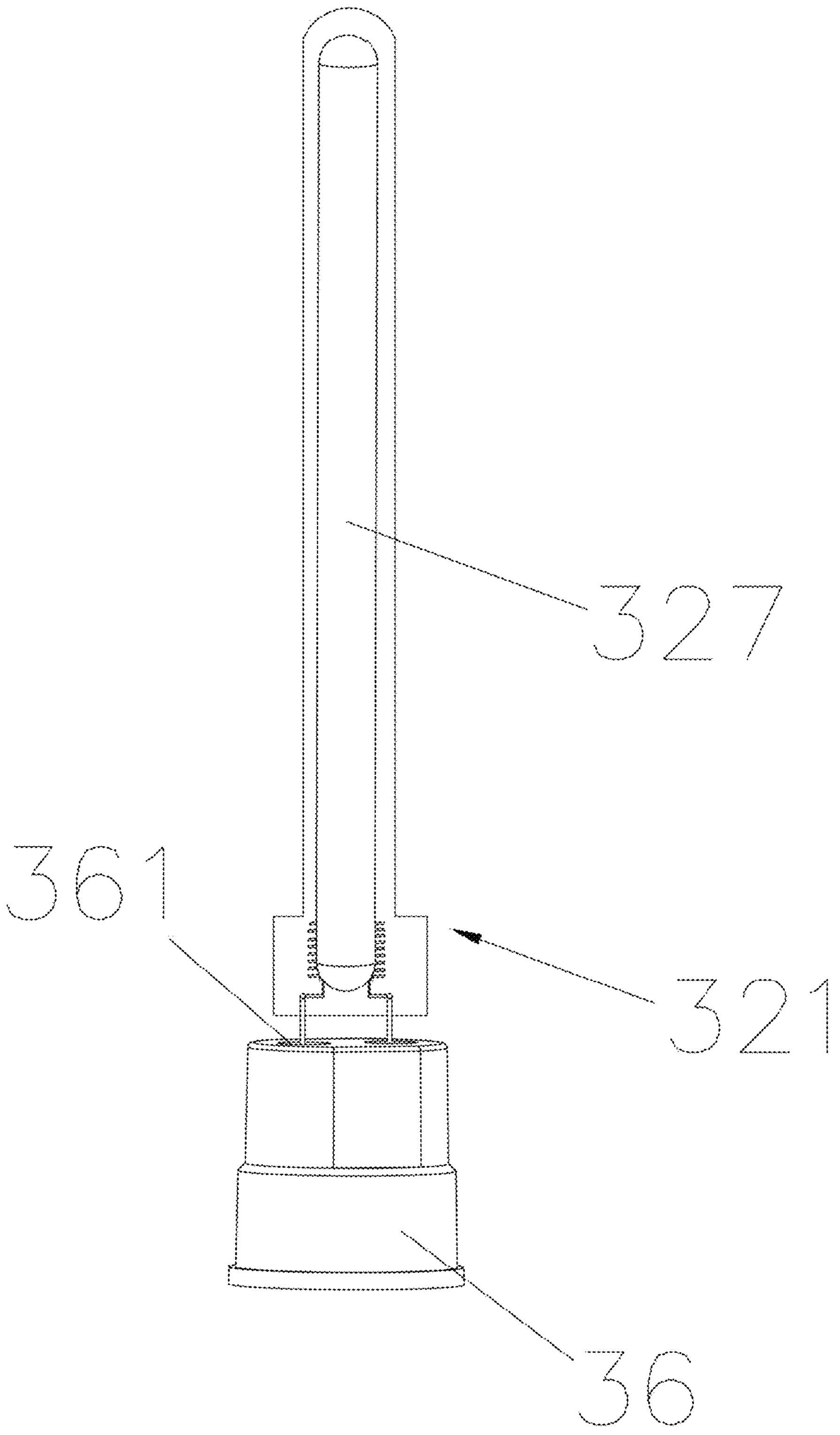
FIG. 5 is a schematic structural diagram of a lampwick component according to the present disclosure.
Figure 6:
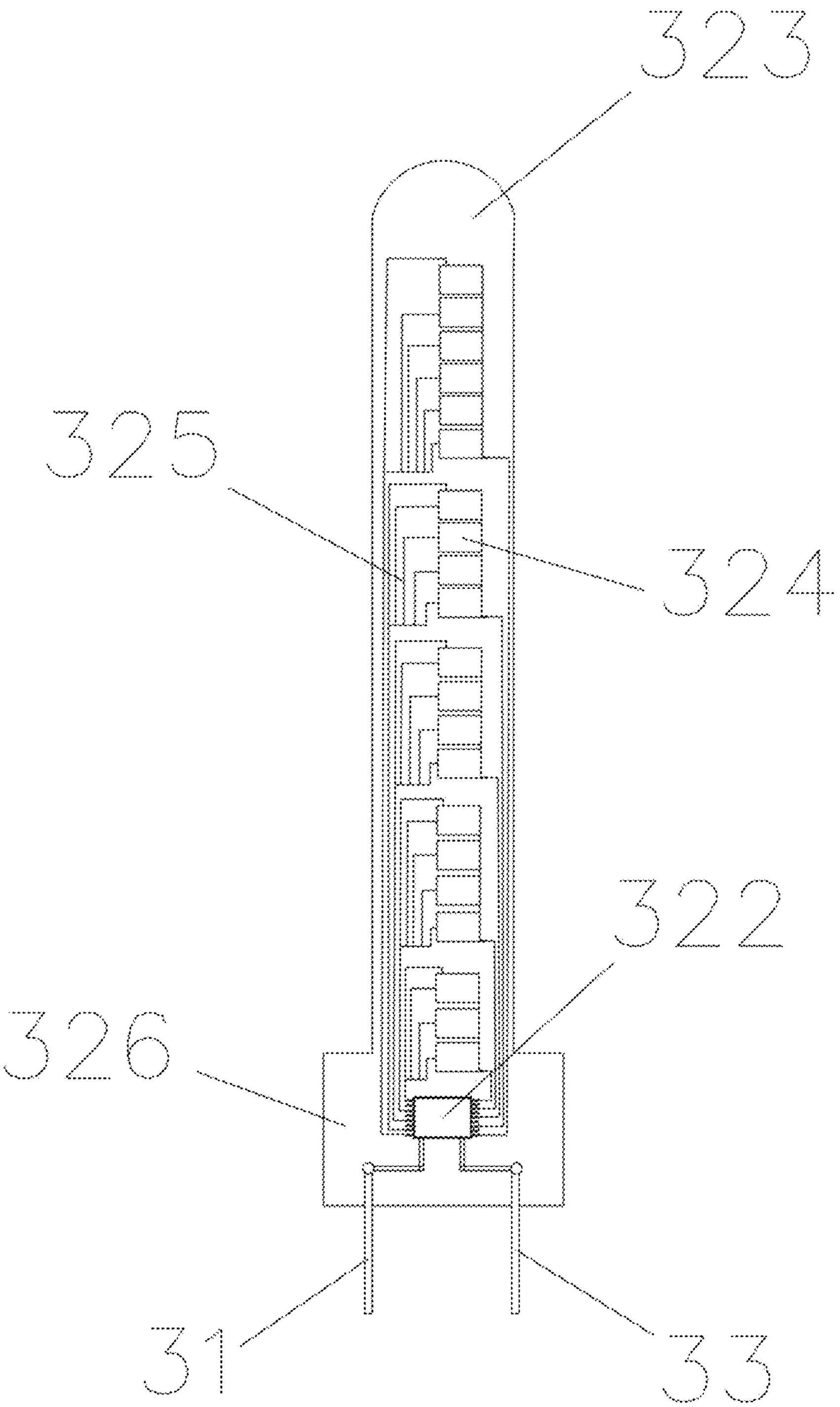
FIG. 6 is a schematic structural diagram of a PCB light source panel according to the present disclosure.

As shown in FIG. 1 and FIG. 4, the present disclosure provides an outdoor decorative lamp 1000, including a lamp bulb 100 and a decorative shell 4. In the embodiment, the lamp bulb 100 includes a lamp holder 1, a lampshade 2, and a lampwick component 3. The lampshade 2 is connected to the lamp holder 1. The lampshade 2 is made of a light-transmittance material. The lampwick component 3 is connected to the lamp holder 1 and extends into the lampshade 2. As shown in FIG. 4 to FIG. 6, the lampwick component 3 includes a first conductive core wire 31, an LED luminescent lamp body 32, and a second conductive core wire 33 which are connected in sequence. The LED luminescent lamp body 32 extends into the lampshade 2 and is configured to generate a light effect. The first conductive core wire 31 and the second conductive core wire 33 are respectively connected to two ends of the LED luminescent lamp body 32 and used as two poles of a power supply, which are electrically connected to the lamp holder 1 respectively.

Figure 2:
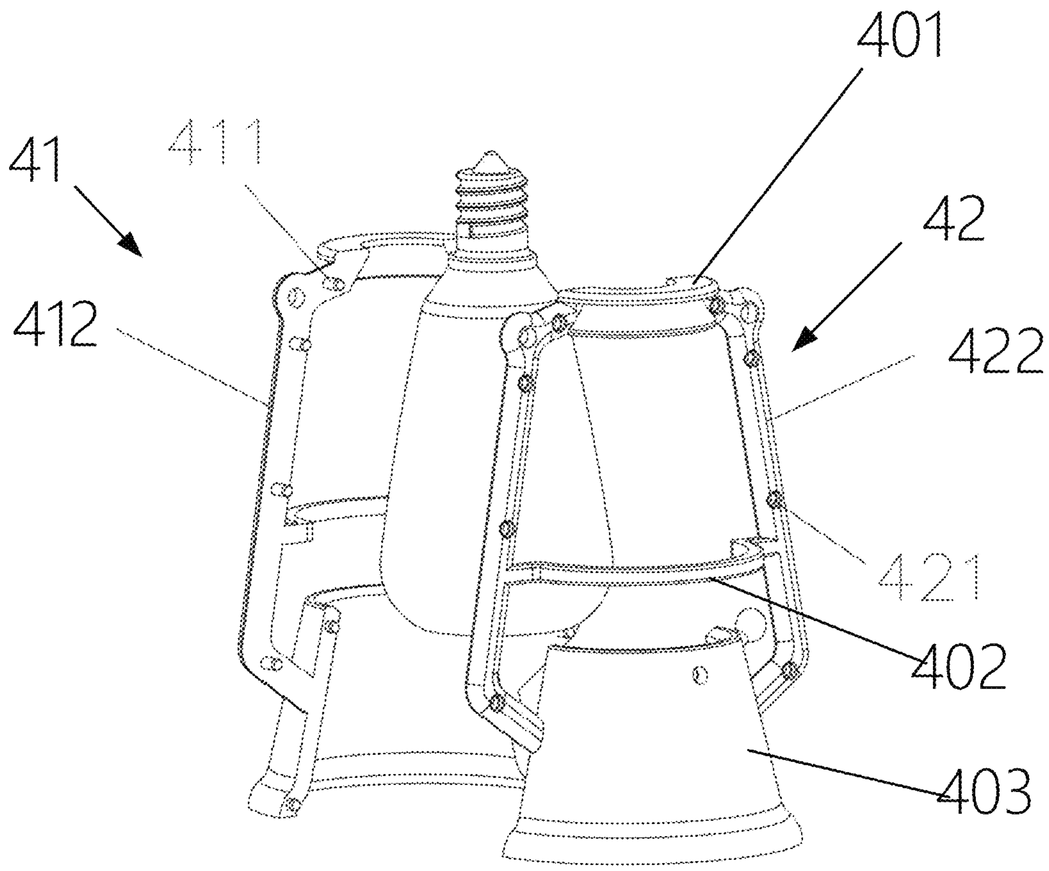
FIG. 2 is a schematic diagram of an exploded structure according to the present disclosure.
Figure 3:
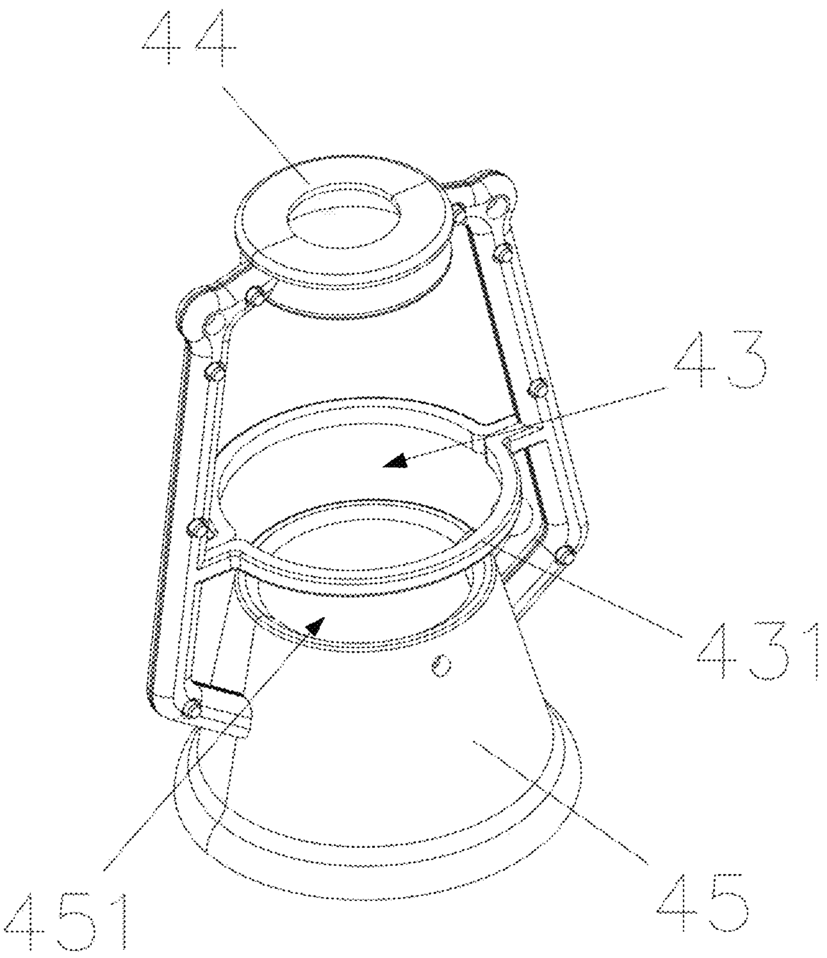
FIG. 3 is a schematic structural diagram of a decorative shell according to the present disclosure.

In the embodiment, as shown in FIG. 1 to FIG. 3, the decorative shell 4 includes a first shell body 41 and a second shell body 42, where the first shell body 41 and the second shell body 42 are detachably connected to each other to form a circular accommodating cavity 43. The lampshade 2 is arranged in the accommodating cavity 43, so that the decorative shell 4 sleeves the lampshade 2 to form a barn lantern lamp.

Specifically, each of the first shell body 41 and the second shell body 42 includes an arc-shaped first hoop 401 at a top of the shell body. When the first shell body 41 and the second shell body 42 are connected to each other, the first hoops 401 on the first shell body 41 and the second shell body 42 cooperate to form an annular limiting hoop 44 arranged at a top of the accommodating cavity 43. The annular limiting hoop 44 is configured to limit the lampshade 2 within the accommodating cavity 43, which can prevent the lampshade 2 from being separated from the decorative shell 4. The lamp holder 1 extends outside of the accommodating cavity 43 through the annular limiting hoop 44, to be connected to an external lamp base (not shown).

In the outdoor decorative lamp 1000 provided in the embodiment of the present disclosure, in order to reduce the usage cost of the existing LED barn lantern string, the lamp bulb 100 and the decorative shell 4 are assembled together to transform an existing integrated barn lantern lamp into a replaceable barn lantern lamp. The lamp 1000 can be electrically connected to the external lamp base by using the threaded lamp holder 1 with an exposed top end. When a certain light string of the lamp bulb 100 fails, the lamp bulb 100 can be replaced with a new lamp bulb, and the lamp 1000 can be used again. This significantly reduces the usage cost of the lamp 1000 and prolongs the service life of the lamp 1000. On the other hand, on the basis of the ability of simulating the shape of a barn lantern, the lamp 1000 has a simple overall structure. This lamp 1000 is only formed by combining the lamp bulb 100 with the decorative shell 4, and the decorative shell 4 is formed in a split type. During the assembling of the lamp 1000, the two shell bodies 41 and 42 of the decorative shell 4 are aligned with an assembling position of the lampshade 2 and are directly buckled to form the lamp 1000. The assembling process is simple and efficient, and can reduce the preparation cost of the lamp 1000.

As an embodiment, a side wall of the accommodating cavity 43 is hollowed out. The accommodating cavity 43 simulates a shape of a barn lantern by directly relying on the lampshade 2, instead of adding a transparent shell on the decorative shell 4, so that the preparation cost of the lamp 1000 is further reduced. In a further optimized technical solution, as shown in FIG. 1 to FIG. 3, each of the first shell body 41 and the second shell body 42 further includes an arc-shaped second hoop 402 at a middle of the shell body. When the first shell body 41 and the second shell body 42 are connected to each other, the second hoops 402 on the first shell body 41 and the second shell body 42 cooperate to form an annular limiting frame 431 at the middle of the accommodating cavity 43. During use, the annular limiting frame 431 sleeves on and abuts against an outer sidewall of the lampshade 2, which can further prevent the lampshade 2 from being separated from the decorative shell 4.

As an embodiment, the first shell body 41 is provided with two first side walls 412 facing the second shell body 42 and a plurality of connecting columns 411 uniformly arranged on the two first side walls of the first shell body 41. Correspondingly, the second shell body 42 is provided with two second side walls 422 facing the first shell body 41 and and a plurality of connecting holes 421 arranged on the two second side walls. The connecting holes 421 correspond one-to-one with the connecting columns 411. The first shell body 41 and the second shell body 42 are assembled together by connecting the connecting columns 411 to the connecting holes 421. This connection method is convenient for assembling and has high efficiency. Both the connecting column 411 and the connecting hole 421 can be formed together with their corresponding shell bodies during the formation of their corresponding shell bodies, without requiring additional process steps. Meanwhile, after the shell bodies 41 and 42 are connected, they can also be disassembled, so that the decorative shell 4 is recyclable, which further reduces the usage cost of the lamp 1000.

As another embodiment, the first shell body 41 and the second shell body 42 are ultrasonically welded or bonded. Whether they are ultrasonically welded or bonded and formed by glue, the two shell bodies of the decorative shell 4 has higher connection strength.

In this technical solution, the decorative shell 4 is in a shape of a barn lantern. After the decorative shell 4 sleeves the lampshade 2, a decoration effect of the traditional barn lantern can be simulated, so that the lamp 1000 has higher decorativeness.

Preferably, as shown in FIG. 1 to FIG. 3, each of the first shell body 41 and the second shell body 42 further includes a half shell 403 at a lower end of the shell body. When the first shell body 41 and the second shell body 42 are connected to each other, the half shells 403 on the first shell body 41 and the second shell body 42 cooperate to form a lamp base 45 arranged at a lower end of the decorative shell 4, where the lamp base 45 is provided with an accommodating opening 451. After the lampshade 2 is placed into the accommodating cavity 43, a bottom end 201 of the lampshade 2 can adapt to and be received in the accommodating opening 451, so as to fix the bottom end 201 of the lampshade 2.

Further, as shown in FIG. 1 and FIG. 4, the lampshade 2 includes an assembling ring 21 arranged at an upper end 202 of the lampshade 2 and connected to the lamp holder 1. The assembling ring 21 is received in the accommodating cavity 43 and abuts against the annular limiting hoop 44 to fix the upper end 202 of the lampshade 2 and limit the lampshade 2 within the accommodating cavity 43.

In this technical solution, as shown in FIG. 5 and FIG. 6, the LED luminescent lamp body 32 includes a PCB 321 and an IC drive controller 322 arranged on the PCB 321. The PCB 321 has at least one elongated light source integration part 323 extending into the lampshade 2. The light source integration part 323 is provided with two light-emitting chip groups 324 on at least one side surface. The PCB 321 is printed with a conductive pattern 325. The IC drive controller 322 is electrically connected to the light-emitting chip groups 324 through the conductive pattern 325 and turns on cyclically the light-emitting chip groups 324 in sequence. The first conductive core wire 31 and the second conductive core wire 33 are both electrically connected to the IC drive controller 322. When the lampwick component 3 of the present invention is powered on for use, a current flows through the IC drive controller 322 through the first conductive core wire 31, and then the IC drive controller 322 controls the current to be transferred to the plurality of light-emitting chip groups 324 in sequence, so that the light-emitting chip groups 324 are turned on or turned off in sequence along a layout direction, forming a flowing type light effect. When the lampwick component 3 is stopped, the current flows back through the second conductive core wire 33.

In addition to greatly reducing the usage cost of the lamp 1000, the present invention also improves the structure of the lampwick component 3. The light-emitting chip groups 324 are integrated into the light source integration part 323 to form a lampwick with the flowing type light effect. Cooperative use with the barn lantern shell further improves the decoration effect. Meanwhile, the flowing type lamp has the advantages of small volume, low cost, convenience of use, and the like.

Further, the PCB 321 is further provided with a supporting part 326, and the IC drive controller 322 is arranged on the supporting part 326. A width of the supporting part 326 should be greater than a width of the light source integration part 323, thereby reserving an enough space to assemble the IC drive controller 322 and achieving welding to the conductive core wires. On the other hand, the PCB 321 is further provided with an outer packaging layer 327 configured to package the light-emitting chip groups 324 and the IC drive controller 322. The outer packaging layer 327 ensures that the conductive pattern 325 between the light-emitting chip groups 324 and the IC drive controller 322 is not easily damaged during assembling, which effectively prolongs the service life of a lamp bulb. On the other hand, the outer packaging layer 327 can also improve the aesthetics of the light source integration part 323, thereby improving the aesthetics of the lamp bulb. A material of the outer packaging layer 327 is epoxy resin, polyurethane modified epoxy resin, or polyurethane resin. These materials have the advantages of high-temperature resistance, good toughness, no irritating odor, and the like.

Preferably, the lampwick component 3 further includes a sealant seat 36. The sealant seat 36 is in close fit with an opening part of the lampshade 2. The sealant seat 36 is provided with at least two accommodating holes 361 for allowing the conductive core wires 31 and 33 to pass through. The sealant seat 36 can provide a supporting force for the LED luminescent lamp body 32 to stably arrange the LED luminescent lamp body 32 inside the lampshade 2, and can also seal the opening part position of the lampshade 2 to improve the waterproof performance of the lampshade 2.

The above content only describes preferred embodiments of the present disclosure. A person of ordinary skill in the art can make changes to specific implementations and the application scope according to the idea of the present disclosure. The content of this specification should not be understood as a limitation on the present disclosure.

What is claimed is:

1. An outdoor decorative lamp, comprising:

a lamp holder;

a lampshade connected to the lamp holder;

a lampwick component connected to the lamp holder and extending into the lampshade; wherein the lampwick component comprises a first conductive core wire, a light-emitting diode (LED) luminescent lamp body, and a second conductive core wire which are connected in sequence; and a decorative shell comprising a first shell body and a second shell body; wherein the first shell body and the second shell body are detachably connected to each other to form an accommodating cavity for receiving the lampshade;

wherein each of the first shell body and the second shell body comprises an arc-shaped first hoop at a top of the shell body, an arc-shaped second hoop at a middle of the shell body, and a half shell at a lower end of the shell body; wherein when the first shell body and the second shell body are connected to each other, the first hoops on the first shell body and the second shell body cooperate to form an annular limiting hoop at a top of the accommodating cavity, wherein the annular limiting hoop is configured to limit the lampshade within the accommodating cavity, and the lamp holder extends outside of the accommodating cavity through the annular limiting hoop; the second hoops on the first shell body and the second shell body cooperate to form an annular limiting frame at the middle of the accommodating cavity, wherein the annular limiting frame is configured to sleeve on and abut against an outer sidewall of the lampshade; the half shells on the first shell body and the second shell body cooperate to form a lamp base at a lower end of the decorative shell, wherein the lamp base is provided with an accommodating opening adapting to a bottom end of the lampshade; the accommodating opening is configured to receive and fix the bottom end of the lampshade.

2. The outdoor decorative lamp according to claim 1, wherein a side wall of the accommodating cavity is hollowed out.

3. The outdoor decorative lamp according to claim 1, wherein the first shell body is provided with two first side walls facing the second shell body and a plurality of connecting columns arranged on the two first side walls;

the second shell body is provided with two second side walls facing the first shell body and a plurality of connecting holes arranged on the two second side walls; wherein the connecting holes correspond one-to-one with the connecting columns, and the first shell body and the second shell body are assembled together by connecting the connecting columns to the connecting holes.

4. The outdoor decorative lamp according to claim 1, wherein the first shell body and the second shell body are ultrasonically welded or bonded.

5. The outdoor decorative lamp according to claim 1, wherein the decorative shell is in a shape of a barn lantern.

6. The outdoor decorative lamp according to claim 1, wherein the lampshade is provided with an assembling ring arranged at an upper end of the lampshade and connected to the lamp holder; wherein the assembling ring is received in the accommodating cavity and abuts against the annular limiting hoop.

7. The outdoor decorative lamp according to claim 1, wherein the LED luminescent lamp body comprises a printed circuit board (PCB) and an integrated circuit (IC) drive controller arranged on the PCB; the PCB has at least one elongated light source integration part extending into the lampshade; the light source integration part is provided with two light-emitting chip groups on at least one side surface; the PCB is printed with a conductive pattern; the IC drive controller is electrically connected to the light-emitting chip groups through the conductive pattern and turns on cyclically the light-emitting chip groups in sequence; and the first conductive core wire and the second conductive core wire are both electrically connected to the IC drive controller.

8. The outdoor decorative lamp according to claim 7, wherein the PCB is further provided with a supporting part; the IC drive controller is arranged at the supporting part; and the PCB is further provided with an outer packaging layer configured to package the light-emitting chip groups and the IC drive controller.

9. The outdoor decorative lamp according to claim 1, wherein the lampwick component further comprises a sealant seat; the sealant seat is in close fit with an opening part of the lampshade; and the sealant seat is provided with at least two accommodating holes for allowing the conductive core wires to pass through.

* * * * *